(12) United States Patent
Klimovitsky et al.

(10) Patent No.: US 6,498,697 B1
(45) Date of Patent: Dec. 24, 2002

(54) METHOD AND SYSTEM OF MAGNETIC RECORDING AND REPRODUCING WITH ULTRA-HIGH DENSITY

(76) Inventors: Alexandr M. Klimovitsky, 217 Auburn St., # 5, Cambridge, MA (US) 02139; Vladimir A. Klimovitsky, 217 Auburn St., # 5, Cambridge, MA (US) 02139

( * ) Notice: Subject to any disclaimer, the term of this patent is extended or adjusted under 35 U.S.C. 154(b) by 0 days.

(21) Appl. No.: 09/351,611

(22) Filed: Jul. 12, 1999

(51) Int. Cl.$^7$ ................................................ G11B 5/02
(52) U.S. Cl. ...................... 360/55; 360/122; 360/125
(58) Field of Search ......................... 360/55, 122, 125, 360/131, 110

(56) References Cited

U.S. PATENT DOCUMENTS

| | | | | |
|---|---|---|---|---|
| 4,287,544 A | * | 9/1981 | Lazzari | 360/131 |
| 4,546,398 A | * | 10/1985 | Toda et al. | 360/126 |
| 5,289,202 A | * | 2/1994 | Yamane et al. | 346/74.3 |

FOREIGN PATENT DOCUMENTS

EP        0101352 A1 *   2/1984   ............ G11B/5/12

* cited by examiner

Primary Examiner—David Hudspeth
Assistant Examiner—Dan I. Davidson

(57) ABSTRACT

Method and system of perpendicular magnetic recording and reproducing with ultra-high density for use in computer storage, audio, video recording euipment. Marks, as logical "1"-s are recorded at predeteremined distance from one another and their magnetic axes oriented in the opposite directions, as logical "0"-s are non-magnetized, forming pattern similar to chess-board order with the zero potential lines, eliminating crosstalk. Interaction "head-medium" is based on non-contact magnetic modulation, eliminating tribology problems. System may compose single or multi track medium, transporting linearly or rotating, with the immovable, quasi-immovable or scanning bi-polar or unipolar magnetic heads, which have extremely small pointing conjugation area for interation with superminiature dimensions of magnetic fields of marks. System is realized by forming and recognizing the logical meaning of signals under checking of the strict general sequence different-directed alternation marks inside the tracks and in the neighboring tracks relatively of each other.

16 Claims, 8 Drawing Sheets

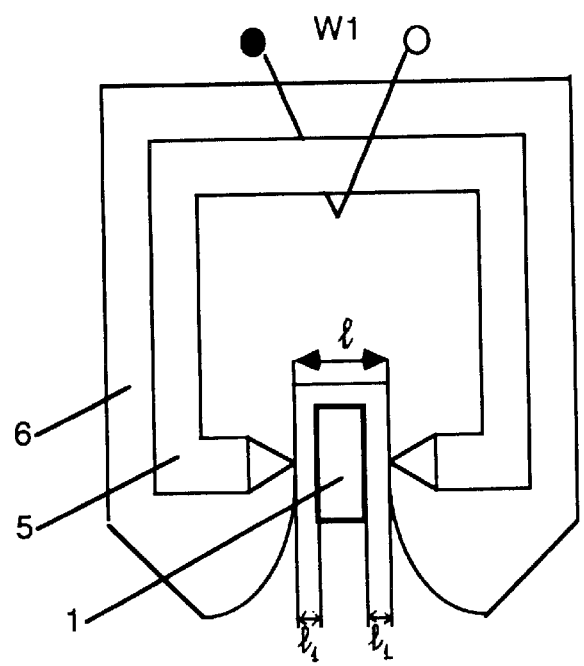
FIG. 3.a
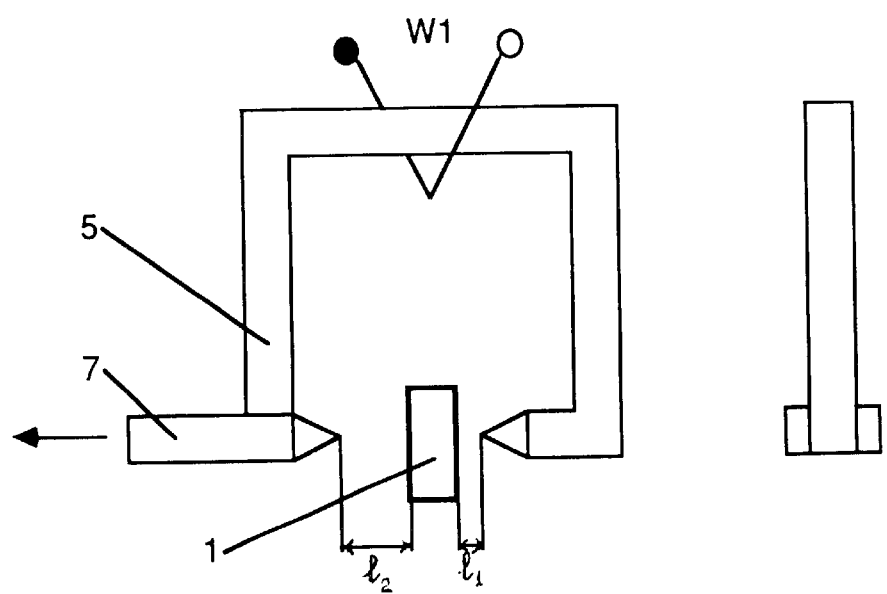
FIG. 3.b

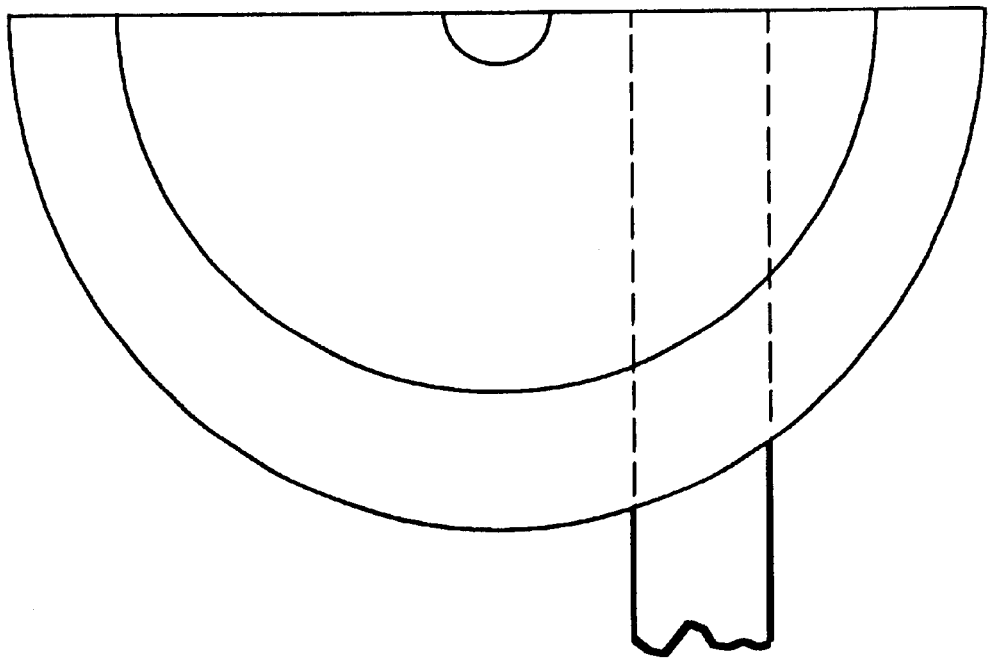
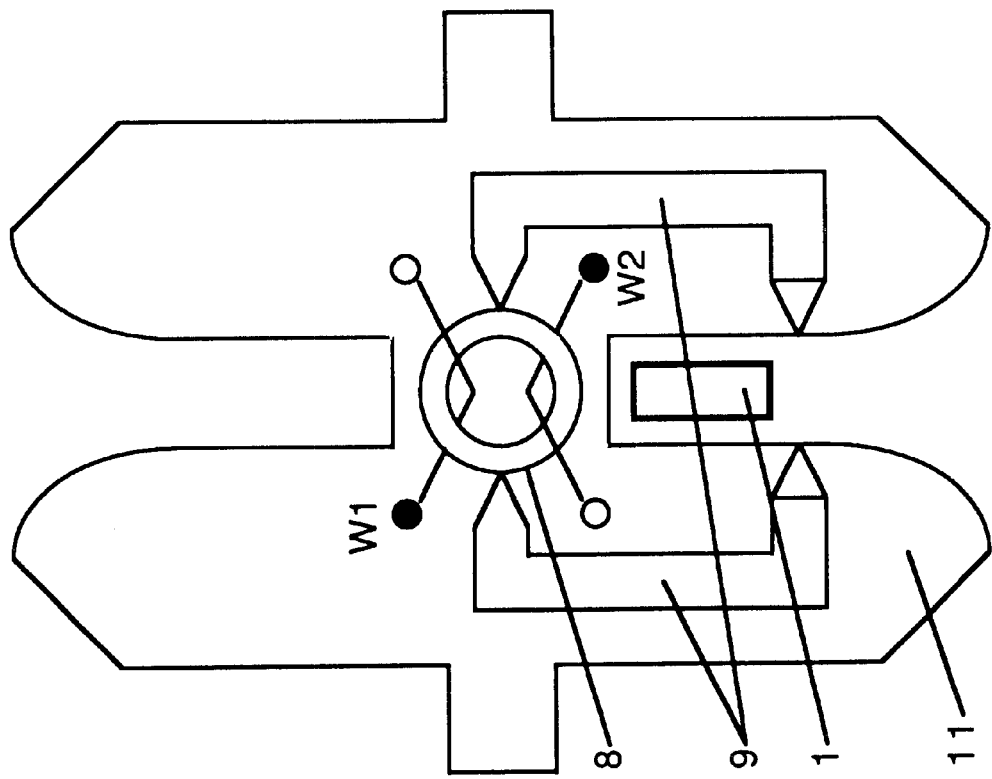
FIG. 8.a

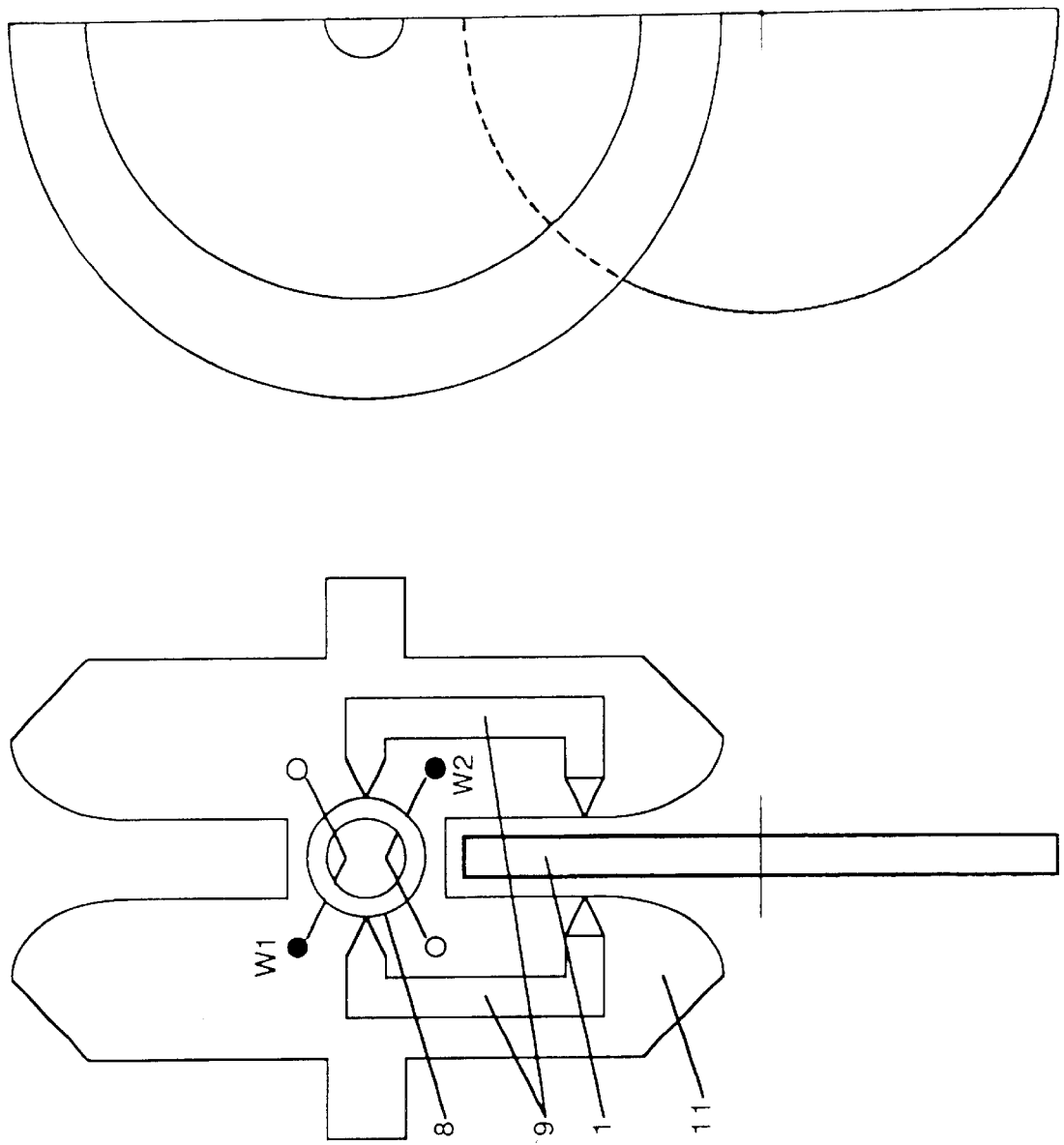
FIG. 8.b

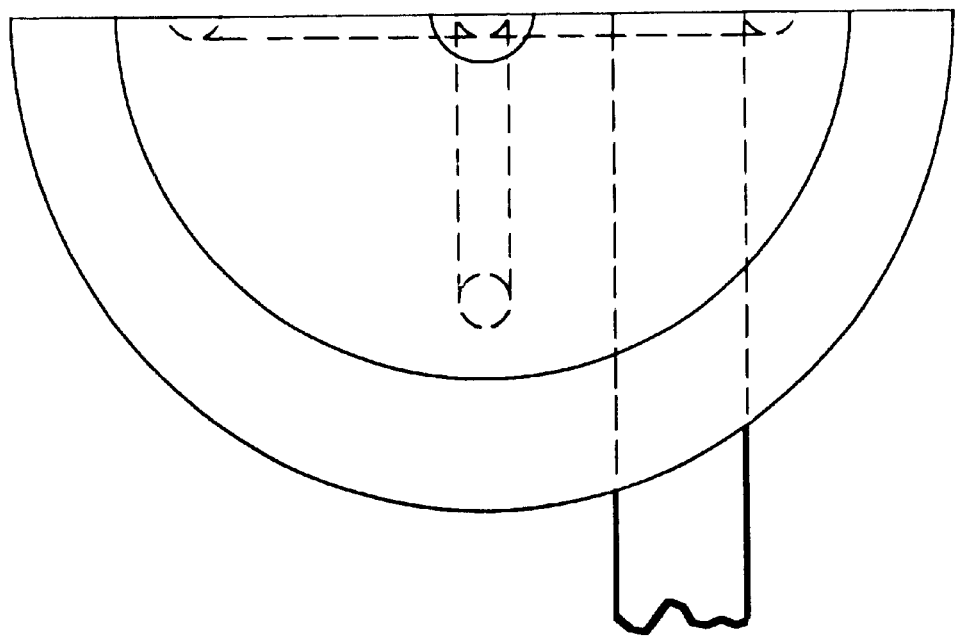
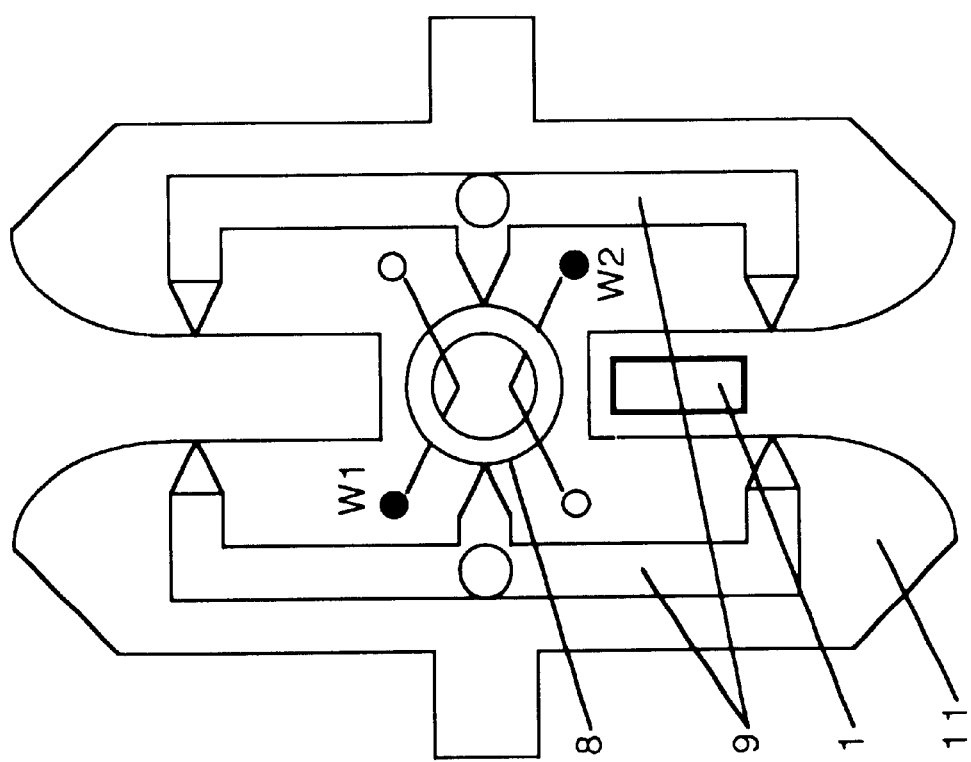
FIG. 9

METHOD AND SYSTEM OF MAGNETIC RECORDING AND REPRODUCING WITH ULTRA-HIGH DENSITY

FIELD OF INVENTION

This invention relates to field of magnetic recording and reproducing. It can be used in computer data storage devices, and devices for storing audio and video signals. Method and system of said magnetic recording and reproducing provide ultra-high degree of data density on various types of magnetic medium (magnetic tape, magnetic discs etc.). This method also allows building single-track and multi-track memory devices.

BACKGROUND OF INVENTION

Process of magnetic recording and reproducing can be of two types:

A. Applying magnetic marks in parallel to the plane of magnetic medium (longitudinal in audio systems and computers; transverse and helical in video systems), and B. Applying magnetic marks perpendicular to this plane.

Induction method known in the art is being used most widely. This method has several limitations, among them the following:

1. Part of the field extended from air gap of the magnetic head is used for recording. It is done by convexing of the leakage flux extended from the air gap in the space external to the gap. If the air gap is very small (which is needed to get higher data recording density and higher frequency of the recorded data), then the magnetic energy extended outside the gap becomes very small and inefficient for utilization of the magnetizing force of the magnetic head on the data signal because maximum intensity vector of this force extends inside the gap along the average line of the magnetic circuit of the magnetic head.

2. When recorded data are being read, only partial utilization of the magnetic mark recorded on the magnetic medium is used, particularly that part of the mark which leakage flux faces the magnetic head, therefore lowering the amplitude of data signals.

3. Usually windings dimensions of the magnetic head are relatively larger than magnetic marks recorded on the magnetic medium. At uniform motion of the magnetic medium (magnetic tape, magnetic disc etc) in the vicinity of said gap of magnetic head, there will be non-uniformity of the magnetic marks recorded vertically (perpendicular to the medium) and also horizontally (in parallel to the medium motion) thus creating noises [B.1].

4. Significant size of conjunction area between head and magnetic medium limits data (signal) recording density on the medium.

5. Level of induced electromotive force E of the read signals depends on the speed of magnetic medium against magnetic head (dB/dt), number of winding turns W1, and the magnetic circuit cross-section S of the magnetic head, as following:

$$E = -(dB/dt) \times W1 \times S \quad (1)$$

To increase induced electromotive force one needs to increase number of head winding's turns and magnetic circuit cross-section. This increase leads to the:

Increase of geometric dimensions of the magnetic head, increase of leakage of magnetic fluxes, which in turn leads to lower data (signal) recording density on the medium, and prevents system from micro-miniaturization.

Increase of the magnetic head inductance, which in turn influences forms, durations, frequencies and phase shifts of signals.

6. Geometric wavelength $\lambda$ of the magnetic marks recorded on the plane in parallel to the magnetic medium layer influences surface density. It depends on the reciprocal relationships of the magnetic medium motion speed V against the magnetic head and applied recording frequency f:

$$\lambda[mm] = V[mm/sec]/f[Hz(1/sec)] \quad (2)$$

Decrease of the magnetic medium motion speed and increase of the frequency lead to decrease of geometric wavelength of magnetic marks and therefore increase of surface density. However, using the induction method leads to contradictory results because decrease in speed leads to decrease of induced electromotive force level at recording, and the increase of frequency shifts dynamic range of the frequency characteristic.

7. Most modern systems of magnetic recording have essential displacement speed of the magnetic medium and the magnetic heads against each other. This leads to increased surface wear due to contact friction between neighboring surfaces, and to loss of reliability of recording and reproducing quality (tribology problems), limits lifetime, lowers durability.

8. Frequency characteristics depend on air gap of the magnetic head (especially for the low frequencies and the high frequencies at the pair harmonics). Wavelengths are the multiples of said air gap value (gap effect).

In the last years there intensive R&D works have been conducted on the subject of perpendicular magnetic recording. High attention received the method of such relation of the magnetic head and medium in which magnetic flux makes full size magnetic marks, where flux coming through the magnetic circuit of the head [B.2]. This method allows achieving higher surface density. However, this density is essentially smaller than that of the laser marks recording on compact discs (CD's). However, even the laser recording method is non-contact and has no friction with the recording surface, it still lacks the ease of re-recording.

The proposed method and system of magnetic recording and reproducing solves a number of problems. The most important of these solutions are presented in this invention.

SUMMARY OF INVENTION

The object of this invention consists in:

Achievement of the ultra-high degree of surface data recording density on any magnetic medium (magnetic tape, magnetic disks and others), equal or higher than density achieved at laser beam recording;

Utilization of the magnetic field as natural means for non-contact interaction between the magnetic medium and the head movable relatively each other, when recording and reproducing the magnetic marks on the magnetic medium (elimination of tribology problems);

Allowability of micro miniaturization due to essential decrease of the conjugation surface between head and the magnetic media; possibility to build single-track and multi-track magnetic data storage devices together with elimination or essential simplification of head coordinate displacement mechanism;

Increased independence of signal level and frequency characteristics from speed of magnetic medium relatively to magnetic head, with potential lowering of this speed;

Elimination of cross-talks between neighboring marks at the same track and between neighbouring tracks;

Significant increase of speed of data (magnetic mark) access for recording (writing) and reproducing (reading) operations;

Achievement of high-quality recording and reproducing, and also stability, reliability and longevity;

Applicability to different structures of magnetic recording and reproducing systems, i.e. in computer data storage devices, and devices storing audio and video signals.

This is achieved by:

Utilization of the magnetic recording and reproducing method with ultra-high density:

Marks on the magnetic medium track are inserted perpendicular to its plane and their magnetic axes of neighboring marks are oriented in opposite directions so that, for example, data corresponding to the logical (binary) "one" stay in parallel to each other on some distance;

The marks corresponding to logical (binary)"zero" retain their locations at said track and remain non-magnetized at initial recording, or are demagnetized to zero value at repeated recordings;

Logical (binary) "one" and "zero" marks on each track are preferably placed on the magnetic medium in parallel to each other form an order similar to chess board;

Binary "zero" lines are being formed between magnetic marks corresponding to logical "ones" and separate them eliminating magnetic field cross-talk between neighbouring marks in the tracks;

Interaction between magnetic medium and the magnetic head is made by non-contact discrete magnetic modulating method;

Possibility of interaction of magnetic medium with uni-polar and bi-polar magnetic head;

Motion of magnetic medium against magnetic head is done at essentially lowered and independent speeds at relatively high clock frequency;

Utilization of single-track or multi-track systems with the medium moving linearly or rotating, with still (immovable), or quasi-immovable, or scanning magnetic head;

In the system comprising:

Recording, reproducing and erasing magnetic heads with corresponding electrical circuits controlling logical data values, said control including checking of exact general sequence of differently-directed magnetic marks inside the track where they are plotted and also in the neighboring tracks, during recording, reproducing and erasing of data, and also, the magnetic medium with the driving mechanism, using two following head-medium interaction types:

BI-POLAR INTERACTION

Recording magnetic head is being an electromagnet with winding and "O"-shaped core, wherein the movable magnetic medium moves within air gap of the core;

Reproducing magnetic head is being a "O"-shaped magnetic circuit composed of toroidal core with two windings and magnetic flux-focusing elongated attachments attached by their first ends to said core and forming working air gap by their respective second ends;

Erasing head is being similar to the recording head.

UNI-POLAR INTERACTION

Recording magnetic head is being an electromagnet with winding and bar-shaped core, one pole of which facing the medium forms the working air gap;

Reproducing magnetic head is the magnetic circuit composed of toroidal core with two windings and the magnetic flux-focusing attachment attached to the core with its first end and forming working air gap by its second end;

Erasing head is similar to the recording head;

In order to achieve stronger interaction with highly miniature magnetic fields near the poles of the magnetic marks, the head's poles-forming attachments have sharpen ends providing extremely small pointed-type surface of conjugation between marks and the flux-focusing attachment. Herewith, all types of heads are mounted in the diamagnetic member having spherical surfaces by the poles;

In the system, having bi-polar heads for the medium placement in the working gap, they are made with movable part of one half of the core (or focusing attachment);

In the system, having both bi-polar and unipolar heads, these heads are made universal and are similar to the corresponding reproducing heads;

In the system, various types of multi-track immovable or quasi-immovable heads with their corresponding toroidal cores and flux focusing attachments forming separate magnetic circuits are grouped together;

In the system for all types of magnetic scanning heads—functional, universal, bi-polar and unipolar—are made in the shape of rotating drum made of the diamagnetic material with slot—working air gap where magnetic head is being put in the center cross-section.

BRIEF DESCRIPTION OF THE DRAWINGS

FIG. 3 shows: a. Design of the recording magnetic head, bi-polar version;

Figure 4:
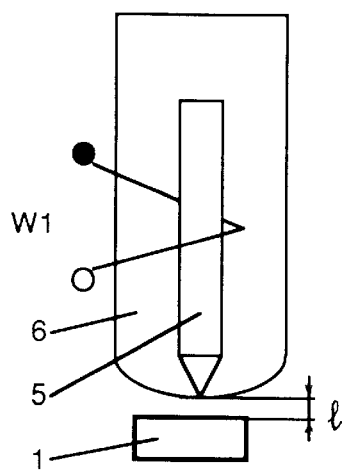
Figure 5:
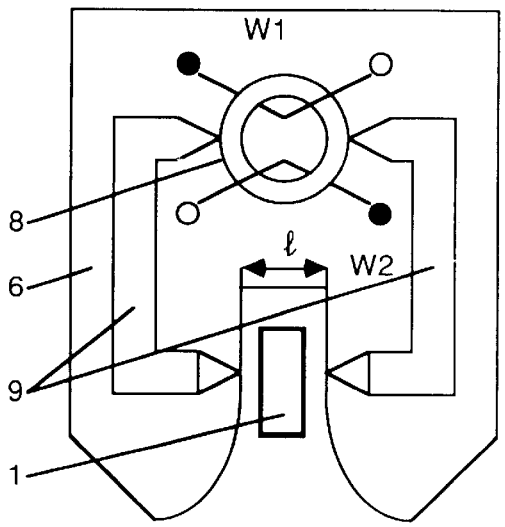
Figure 6:
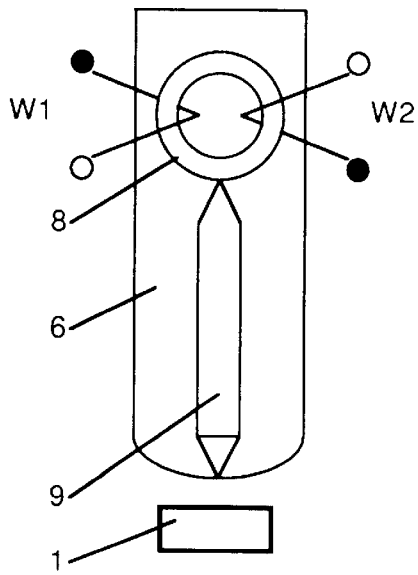
Figure 7:
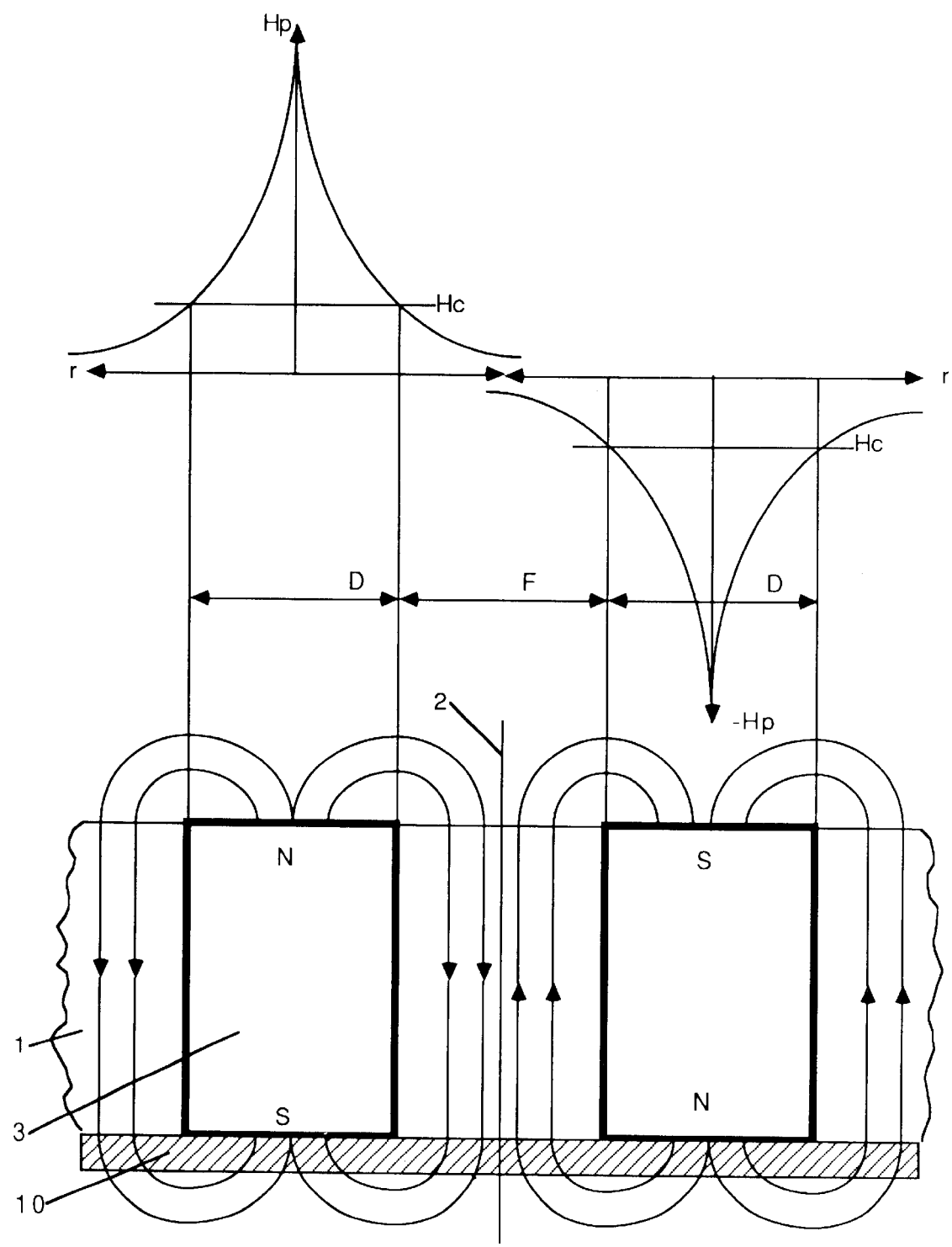
Figure 10:
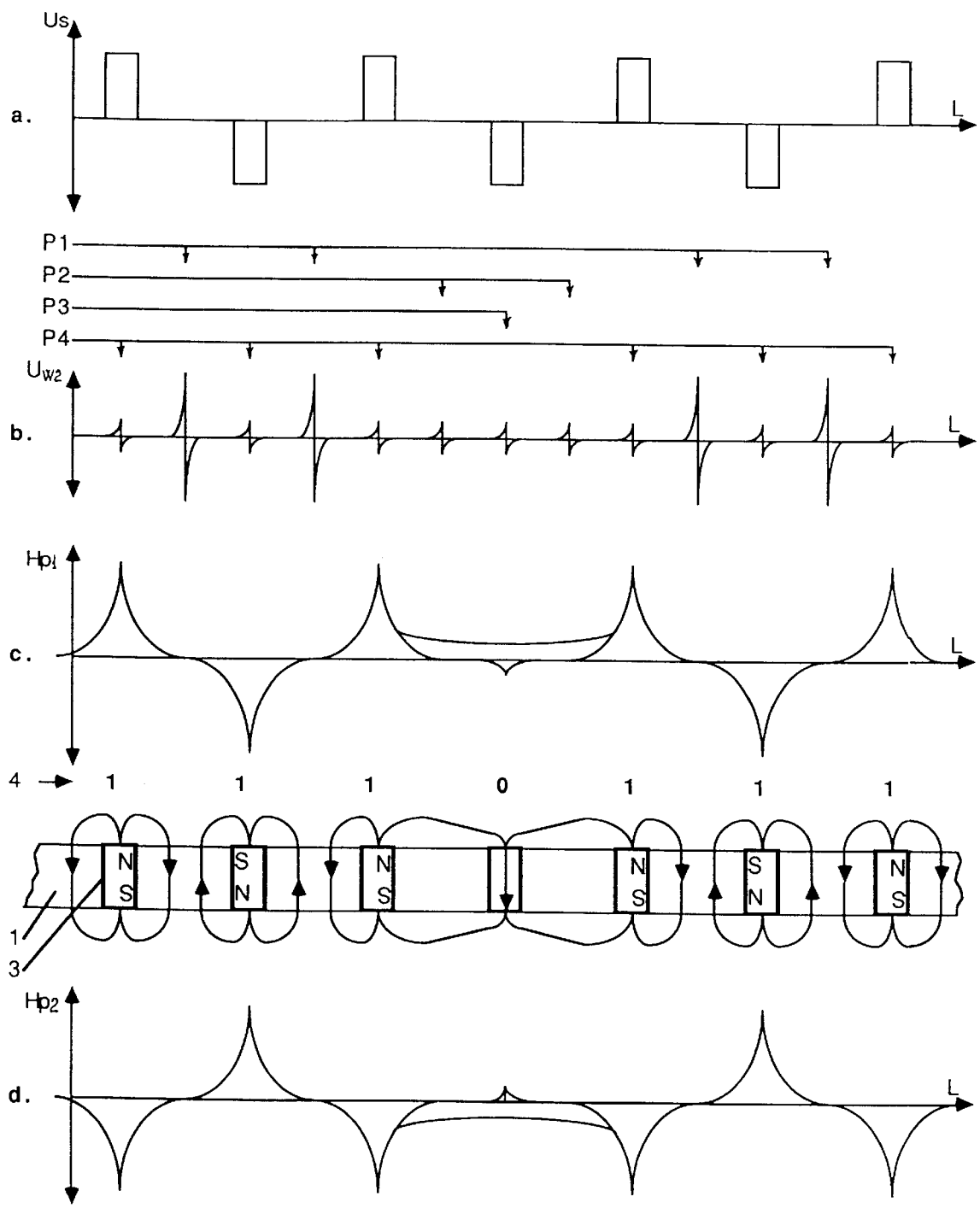

b. Part of core is movable;

FIG. 4 shows design of the recording magnetic head, unipolar version;

FIG. 5 shows design of the reproducing magnetic head, bi-polar version;

FIG. 6 shows design of the reproducing magnetic head, unipolar version;

FIG. 7 shows placing of magnetic marks on the medium surface completely coated by ferromagnetic layer;

FIG. 8. (a. and b.) shows design of bi-polar scanning head;

FIG. 9 shows design of bi-polar scanning head with more than one pair of flux-focusing attachments;

FIG. 10 shows timing diagrams of system's operation, where:

a. Synchronizing pulses Us;

b. Induced pulses $U_{w2}$ on winding W2 during reproducing;

c. Intensity $H_{p1}$ of convexing magnetic field above the magnetic poles of marks;

d. Intensity $H_{p2}$ of convexing magnetic field under the marks' poles.

DESIGNATION ON FIGS.

1—medium;
2—lines of zero potential;
3—magnetic marks;
4—example of coding;
5—electromagnet;
6—member of the diamagnectic head;
7—movable part of head's core;
8—toroidal core;
9—focusing attachments;
10—base material;
11—rotating drum;
N—North pole;
S—South pole;
W1—primary winding;
W2—secondary winding;
l—working gap;
$l_1$—air gap;
$l_2$—widening of working gap;
D—diameter of magnetic mark zone;
F—distance between neighbouring marks;
r—radius of zone, affected by magnetic field at mark's recording;
L—track's length (or time);
Hc—coercitivity force of the ferromagnetic coating;
$H_{p1}$—intensity of convexing magnetic field above the marks' poles;
$H_{p2}$—intensity of convexing magnetic field under the marks' poles;
Us—synchronizing pulses;
$U_{w2}$—the induced pulses on winding W2 at reproducing;
Relate to $U_{w2}$ (FIG. 10.b):
P1—Hp=0, at mutual compensation of the neighbouring mark's leakage fluxes;
P2—Hp>0, suppressed pulses in case of single logical "0" mark;
P3—Hp>0 and >coercitivity force of toroidal core, suppressed pulse by single logical "zero" mark;
P4—Hp=max, suppressed pulses by the logical "one" marks.

DETAILED DESCRIPTION OF INVENTION

The described method allowing to achieve ultra-high density of magnetic data is based on magnetic modulation interaction between magnetic head with magnetic medium having specific location format of magnetic marks and also specific features of magnetic head and the medium themselves.

Figure 1:
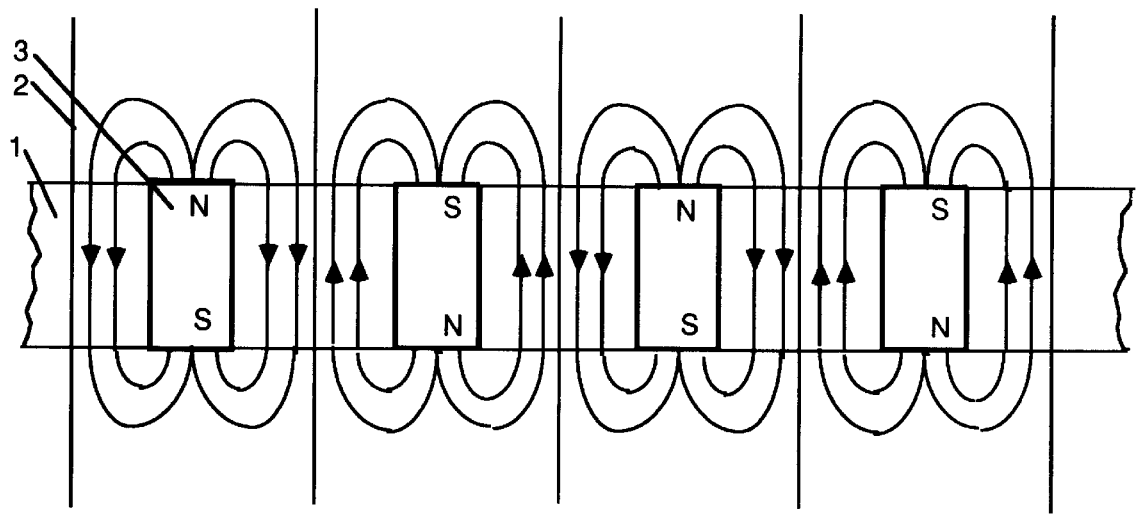
FIG. 1 shows placing of logical "one" marks on the magnetic medium.

Recording of the magnetic marks 3 is to be done perpendicular to the plane of medium, so that neighbouring parallel marks corresponding to logical "ones" will have their magnetic axes orienting in the opposite directions (FIG. 1).

Magnetic marks corresponding to logical "zeros" remain un-magnetized at their corresponding locations at data track build of such "ones" and "zeros". Such "zero" marks remain un-magnetized at initial recording or demagnetized to zero level at repeated recordings.

Use of magnetic marks of different polarity allows to achieve zero levels of magnetic intensity lines 2 at meridian cross-sectional intervals between these neighbouring marks due to mutual compensation (subtraction) of oppositely directed neighbouring magnetic fluxes created by the neighbouring magnetic marks. This allows to considerably shorten these intervals and to bring these marks very close to each other without corrupting of recording-reproducing performance.

In comparison with the method disclosed in the invention, the other methods of magnetic recording and reproducing employing orienting neighbouring parallel magnetic marks' magnetic poles of same polarity in the same direction considerably increase distance at which zero magnetic level can be achieved between the magnetic marks. This evidently leads to considerable increase of the intervals between magnetic marks and decrease of data density on magnetic medium.

Figure 2:
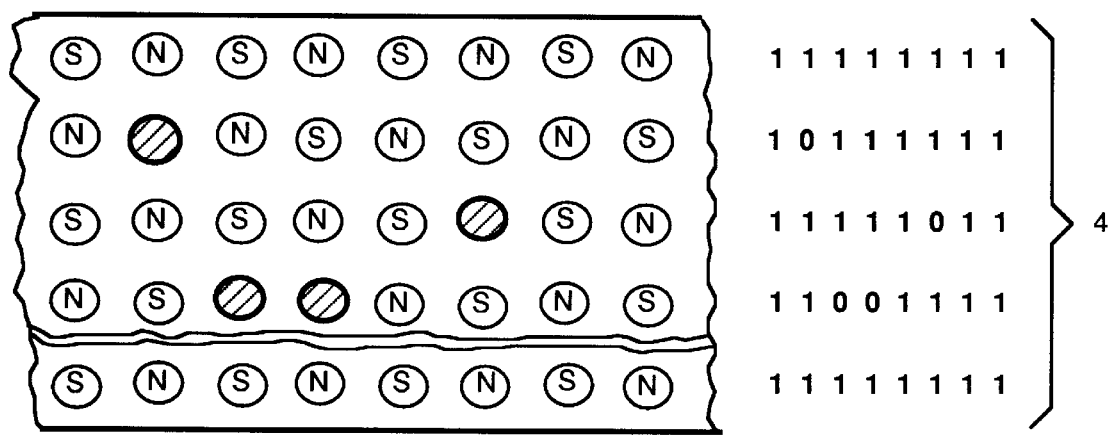
FIG. 2 shows an example of placing logical "one" and "zero" marks on the magnetic medium part.

In order to achieve similar interrelation between neighbouring magnetic marks of the neighbouring data tracks on the preferably orthogonal surface (i.e. magnetic tape) and to allow high density of tracks location to each other, the neighbouring marks in the neighbouring tracks have different polarity axial orientation against each other. Therefore, all magnetic marks are placed on the medium forming chessboard order (FIG. 2).

During recording of logical (binary) "one" magnetic marks on the magnetic medium (when said marks having maximum residual induction) in the encirclement of other logical "one" marks, there will be zero value meridian magnetic potential lines in the cross-sections of orthogonal directions.

The case of single logical "zero" (when magnetic mark is demagnetized to induction equal or close to zero) in the encirclement of other logical "one" marks is extremely unfavorable since equally directed magnetic axes are located on double distance from each other and their magnetic fields are practically do not mutually influence.

Each logical "one" magnetic mark in space above its poles creates special magnetic field which intensity may be expressed by hyperboloid of revolution with sharp vertex of corresponding polarity and hyperbolically diminishes to the meridian zero potential lines.

Such separate and relatively high convexity of the magnetic field above the poles of each logical "one" mark (above medium's surface) allows reading of these marks separately by non-contact method.

If different polarity neighbouring marks are arranged close to each other without zero potential lines between them (i.e. as in [B.2.]), their combined added fluxes form common uninterrupted zigzag-shaped magnetic flux. Thus flux convexity lowering in space surrounding above medium and its intensity is also lowering in the working gap. This leads to lowering of interaction efficiency of the magnetic medium with reproducing head and eliminating discreteness (separation) of this interaction.

Physically speaking, use of super miniature geometric dimensions of separated magnetic fields above the poles of magnetic marks requires the use of the magnetic head capable to interact in the conjugation places with surface of the magnetic medium at similar dimensional scale.

Use of ultra small (pointing type) conjugation surface allows employing magnetic head made similarly to [B.3] describing Precise Measuring Magnetic Converter. In this case magnetic medium may interact with both bipolar head and unipolar head.

Similarity theory proving same results for larger and smaller scale magnetic circuits suggests possibility to achieve this method performance in ultra-small magnetic circuits.

The essence of such theory says that at unchanged magnetic induction the change of magnetic circuit linear dimensions lead to other parameters' change in certain scale because magnetic induction fields' similarity is true for both smaller and larger scale magnetic circuits [B.4].

Relationship of parameters for similar magnetic circuits is presented at Table 1.

TABLE 1

| No | Parameters | Parameter change ratio |
| --- | --- | --- |
| 1 | Linear dimensions | $K$ |
| 2 | Magnetic induction | $K^0$ |
| 3 | Magnetic flux | $K^2$ |
| 4 | Magnetizing force | $K$ |

Table 2 shows examples of comparative numerical values of some parameters for two similar magnetic circuits at given magnetic induction for unipolar head defined on the basis of calculation results and practical experiments. Recording density in scale 1:10,000 is close to the recording density of laser optics recording systems.

TABLE 2

| Scale of standard sizes | 1:1 | 1:10,000 |
| --- | --- | --- |
| Magnetic induction | | 0.55 Tesla |
| Magnetic mark's diameter | 10 mm | 1 mkm |
| Height of magnetic mark | 15 mm | 1.5 mkm |
| Distance between marks | 10 mm | 1 mkm |
| Working gap | 5 mm | 0.5 mkm |

Magnetic medium transport is done with essentially lowered speed at relatively high clock frequency, which allows increasing recording density. Speed and clock frequency are defined by initial size of magnetic mark and do not influence on frequency and other characteristics of system due to the features of magnetic modulation principle features.

The following structures of magnetic recording and reproducing systems with ultra-high density are realized on the basis of this method:

Linearly transporting medium with the magnetic head placed immovably relatively the medium, said head interacting with one of the selected tracks;

Linearly transporting medium with a series of magnetic heads placed immovably relatively this medium or quasi-immovably relatively its separate tracks groups (multi-track head), said head interacting simultaneously with corresponding them tracks;

Linearly transporting medium and scanning head rotating relatively such medium and interacting with it once during each revolution;

Linearly transporting medium and scanning head rotating relatively such medium and repeatedly interacting with it during each revolution;

Rotating medium with relative position of the head and the medium similar to the above;

As any other system for magnetic recording and reproducing being manufactured in wide variety of complexity and quality types, the proposed system consists of the following principal functional parts:

Recording magnetic head converting electrical signals into magnetic field intensity changes;

Reproducing magnetic head converting magnetic marks recorded on the magnetic medium back to the electrical signals;

Erasing magnetic head;

Magnetic medium represented for example by magnetic tape, disc or other means;

Electronic recording circuit (amplifier and logical circuit) processing signals for the recording head;

Electronic reproducing circuit (amplifier and logical circuit) processing signals from reproducing head into output signals;

Electronic erasing circuit (amplifier, oscillator and logical circuit);

Driving mechanism of the magnetic medium.

Consider the above functional parts separately and describe their distinctive features.

Recording magnetic head can be made in two versions: bi-polar head forming magnetic marks by interacting with the magnetic medium from both sides, and uni-polar forming magnetic marks by interacting with the magnetic medium from one side of it.

In first version the head is electromagnet 5 with winding W1 of one or more turns, having "O"-shaped core, and air working gap l. The magnetic medium placed inside said gap (FIG. 3a).

The poles having sharpen ends reduced to point (similar to stylus) surround medium from the opposite surfaces, and are not contiguing with them. Total (summary) air gap $(l_1+l_2)$ remaining constant and not depending on possible deviation of medium inside of the working gap. The head is mounted in the diamagnetic member 6 with spherical surfaces near the poles.

To place medium in the working gap of the magnetic head, the closest to the medium part 7 of the core is made movable relatively the other parts of the core. This shall be arranged in such way to preserve reliable magnetic conductivity in the joint place and precise coaxiality between sharpen ends of the core—the poles (FIG. 3b).

In second version the head and the medium form open magnetic circuit so that medium 1 is placed by its one surface near one of head's poles. The magnetic head here is electromagnet 5 with the bar core, one pole of which facing the medium and also sharpened (FIG. 4).

The reproducing magnetic head has such operating principle and design features that allow making it in two versions (similar to the recording head). One version shall be placement of the magnetic medium inside of the working gap of the "O"-shaped magnetic circuit (bi-polar head), or near some pole of the open magnetic circuit (uni-polar).

In the version with bi-polar magnetic circuit the head (FIG. 5) comprises toroidal core 8 with windings W1 and W2 and focusing attachments 9 making common magnetic circuit with said toroidal core. The circuit interacts with both poles of marks on the magnetic medium. Herewith the medium is being placed between focusing attachments concentrating magnetic flux, said attachments also having sharpen ends reduced to point and are not contiguous with medium surfaces and the total (summary) air gap from both sides of medium surface remain constant and not depending on its possible deviation.

To place the medium in the working air gap of the head, one of the focusing attachments is made of two parts. The part closest to the medium is movable about the other part and retaining reliable magnetic conductivity in the joint place and precise co-axiality between sharpen ends of both focusing attachments.

In the version with unipolar magnetic circuit (FIG. 6) the head interacts with one of the poles of marks on the medium and has only one focusing attachment 9. Medium 1 is placed in such way to allow one of its surfaces to be placed near focusing attachment also having sharpen end.

The erasing magnetic head is made analogous to the recording one (for both versions).

Depending on the erasing application (erasing either selected single marks, or single-tracks on medium, or simultaneously some or whole medium's surface), the erasing head may also have either sharpen ends of core or the expanded poles area of the head—pole pieces having erasing surface equal to the erasable area of the transporting medium.

The magnetic medium can be used in two following versions:

Special pits similar to laser optical information carriers are plotted on the carrying base using methods of microelectronic technology, then these pits are being filled with ferromagnetic material having shape of pillars magnetically insulated from each other; these pillars thus form kind of net consisting of data bits' tracks.

Uniform layer of ferromagnetic coating is applied on the carrying base.

For both versions it is preferred to have ferromagnetic material having properties of perpendicular magnetic anisotropy.

In first version zero potential lines between separate data bits are being formed and passed through diamagnetic parts of medium.

For the logical "one"s the marks of each track is being magnetized in alternating polarity. Herewith, the neighbouring marks on neighbouring tracks also having alternating magnetization polarity and whole magnetic picture of marks jointly forming chess board order.

For logical "zero"s the marks are being demagnetized to zero level. Herewith, the marks having same magnetization direction are located at double distance from each other.

In second version with perpendicular recording on medium's surface completely coated with ferromagnetic layer, each magnetic mark is plotted as cylindrical zone having diameter D (FIG. 7) and is defined by the field $H_p$ in the working gap of the head, this field diminishing from its axial line along zone's radius r to its periphery.

The cylindrical zone is being remagnetized under influence of this field. Inside this zone the intensity created by external field is higher than coercitivity force $H_c$ of the ferromagnetic material coating.

Remagnetization does not happen outside zone limits where external field intensity is smaller than ferromagnetic material coating coercitive force.

Due to perpendicular magnetic anisotropy of the ferromagnetic coating material and arrangement of changing polarity magnetized marks, the lines of zero potential 2 are being created as a result of superposition and compensation of the leakage fluxes. These lines pass through ferromagnetic layer of the medium. This allows achieving essential closeness of the marks to each other.

This phenomenon is explained in similar fashion to one existing at ordinary process of plotting magnetic marks: intensities of the fields created by each mark at certain distance are smaller than coercitive force of medium's ferromagnetic layer and don't lead to magnetization of the areas located at this distance from the mark.

From standpoint of greatest efficiency it is better to use magnetic medium having orthogonal forms (tapes, drums) than circular ones with concentric or spiral tracks (discs).

Tape mediums having extended length allow only sequential access to memory (for computer drives) characterized by increased access time. Drum mediums having essentially high gyration inertial moment.

If magnetic medium has a shape of disk then linear circumferential speed changes because of change of radius of each track on the disc. This circumferential speed increases from disc's axis to its periphery (outside diameter). This situation requires control of angular rotational speed to maintain linear circumferential speed at constant level.

Thus, not eliminating positive features of use of disc magnetic medium, it is sought to develop a cassette as disc's possible substitution having positive features of both the tape and the drum. As such an unlimited tape with any loop size and number of curves (zigzags) may be employed inside the cassette.

The orthogonal form of magnetic medium allows achieving:

Composition of computers drives and other multi-track systems of various capacity using simple connection of them at defined step;

Elimination or essential operational simplification of head's coordinate displacement mechanism;

Substitution of the data stream serial writing (recording) and reproducing (reading) by parallel writing and reading thus leading to essential increase of operational speed during direct memory access;

More efficient utilization of medium area (i.e., useful area of continuous tape having sizes similar to floppy disc having size of 3.5", is 1,53 times higher);

Increase of data capacity at the cassette with retention of compactness.

In the light of the above explanation the reproducing magnetic head presented on FIG. 5, having functional features of recording, reproducing and erasing, can be used as universal head.

During recording, pulses are fed simultaneously into both windings. They create oppositely directed magnetic fluxes in toroidal core. These fluxes adding together, passing through focusing attachments and closing their way through magnetic medium, plot magnetic marks. The frequency of pulses fed into windings is to be chosen depending on motion speed of magnetic medium against the head and on size of the plotted marks.

During reproducing, pulses are fed only in primary winding W1. These pulses induce electromotive force at the secondary winding W2. When magnetized mark is passing through working gap of the head, its flux passes through focusing attachments in the toroidal core, interacts with magnetomotive force of winding W1, saturates it and breaks magnetic coupling between windings W1 and W2. The induced electromotive force at winding W2 becomes equal or close to zero. The clock pulses frequency in primary winding WI shall be several times higher than during recording in order to compensate transient processes when medium's mark passes through head's working gap.

During erasing to zero level, or recording of logical "zero"s the universal magnetic head operatates same way as recording one. Herewith, the process of erasing to zero level can be realized by:

Feeding of the magnetomotive force of selected value with polarity opposite to the recorded magnetic marks;

Damping oscillations with relatively higher frequency on each separate bit.

Electrical and magnetic parameters for each process are calculated and defined in accordance with functional requirements of recording, reproducing and erasing processes.

Depending on its functionality magnetic heads may employ single-track or multi-track technology.

Using single-track technology in some applications (for example, audio systems, computer drives) there is a need to have coordinate mechanisms for head's displacement between the tracks.

Using multi-track technology the magnetic head can be made:

Immovable relatively magnetic medium or quasi-immovable relatively separate groups of tracks. In this case the head may have separate magnetic circuit for each track;

Movable relatively magnetic medium. In this case the head may have one magnetic circuit common for all tracks. This circuit may be repeatedly utilized by scanning sequentially of the bits at all tracks with speed significantly higher in comparison with speed of motion of magnetic medium.

Achieving of ultra small conjugation area of head's sharpen focusing attachments and the magnetic medium allows to develop immovable or quasi-immovable multi-track head with required number of magnetic circuits operating simultaneously with one or more bytes of information data marks.

Design of bi-polar scanning head is presented at FIG. 8(a. and b.). It consists of rapidly rotating drum 11, and magnetic medium 1 moving in slot of this drum. The marks on it are plotted and read by arc-shaped inclined tracks.

Significant decrease of speed of the drum (head) rotation is achieved by increasing a number of pairs of focusing attachments 9, arranged radially in the center cross-sections and attached to the common for all attachments head's toroidal core 8 (FIG. 9). Herewith, their maximum quantity is defined based on the following condition: only one pair interacts with the transported magnetic medium at any time.

Scanning head also can be made as unipolar. In this version, the drum 11 has one missing focusing attachment (i.e. right one).

Both varieties of heads—immovable or movable relatively magnetic medium eliminate the need to have coordinate displacement mechanisms or essentially simplify its operation and are applicable for any multi-track system.

System operation can be realized in different ways, and also with application of known methods of each field of application—in computer drives, in audio and video systems.

One possible solution to it is plotting synchronizing track on magnetic medium by means of recording head, carried out at initial formatting. This track shall participate in control of each information bit in all functional processes. The reproducing begins from marker-index, for example a hole that may be registered by an optical sensor. Magnetic marks of synchronizing track having alternate polarity of their magnetic axes beginning from first odd mark, directed N-S ("North-South"), next even S-N ("South-North") and so on (FIG. 10).

During recording of logical (binary) "one"s plotted on the magnetic medium, different polarity pulses are fed in head's winding with same frequency as synchronizing pulses Us. They remagnetize the core along the major hysteresis loop, thus creating maximum induction change in the working gap.

When logical "zero"s are required on the magnetic medium, unipolar pulses group is fed in head's winding during the corresponding synchronizing pulses. They have polarity opposite to previous pulse of logical "one" (or previous pulses group of logical "zero") and higher frequency. Energy of each pulse is insufficient for complete core remagnetization. Such integrating mode along minor cycles of hysteresis loop during each pulse does not create essential induction change in head's working gap, and therefore, marks are not plotted on medium but sequentially transfer magnetic state of the head's core into the opposite one along hysteresis loop. Thus, any subsequent recording of logical (binary) "one"s is prepared along major hysteresis loop with maximum induction change in head's working gap.

Marks on each track, beginning from first to the last, are plotted with alternate magnetic axes polarity of odd and even marks on the neighbouring tracks against corresponding marks of the synchronizing track. These switchings are carried out with the operational algorithm of the recording circuit logical part. Addressing of each track can be plotted at formatting.

During reproducing, logical "one"s on the track are detected with operational algorithm of the reproducing circuit logical part. Pulses from marks of the synchronizing track come into the input of this reproducing logical part.

At the location on track not having magnetized mark—separate logical (binary) "zero"—the marks' fields Hp of the neighbouring logical "one"-s, convexing above and under medium's surfaces, stream into common field with same polarity of magnetic axes. Herewith, zero potential line between marks does not form, and therefore, internal magnetomotive force of toroidal core 8 created by winding W1 is suppressed at these locations. The non-magnetized mark of logical "zero" (or zone intended for it on the medium) behaves only as magnetoconductive part for the neighbouring marks of logical "one"-s and, being magnetized on this distance by their weakened leakage fields, creates weak external field with the intensity value expressed by hyperboloid of revolution with small height (is shown on FIG. 10c. and d. in place of logical "zero").

If logical "zero"s follow in succession on the track, the zero potential lines and fields of the neighbouring marks are absent. Therefore, internal magnetomotive force of toroidal core 8, created by winding W1 is not suppressed at passing above the marks of logical (binary) "zero"s.

Both of these conditions (either absence of zero potential line between two neighbouring marks of logical "one"s, or their repeating absence in the marks row jointly with synchronizing pulses) are utilized for the development of operational algorithm of logical part of reproducing circuits for detection of logical (binary) "zero"s on the tracks.

Described method and system of the magnetic recording and reproducing can be utilized in the computer storage devices (drives), audio and video recording techniques. In each of these application fields the realization of method allowing achieving ultra-high density is accompanied by choice of magnetic head specific design, magnetic medium type and system operational logical organization.

BIBLIOGRAPHY

1. Marvin Camras. Magnetic Recording Handbook. Van Nostrand Reinhold Co., New York, 1988.
2. Iwasaki, Nakamura. U.S. Pat. No. 4,2551,842 of 1981 "Magnetic Recording and Reproducing Device."
3. Vladimir A. Klimovitsky, Alexandr M. Klimovitsky. U.S. Pat. No. 5,280,239 of 1994 "Precise Measuring Magnetic Converter".
4. Alexandr M. Klimovitsky. Ph.D. Dissertation "Research and Development of Magnetic Devices". Research Institute of Technology, Moscow, USSR.

What is claimed is:

1. A pattern of magnetic marks recorded on and reproduced from a high density magnetic medium using a magnetic head, the magnetic medium having multiple data tracks, the pattern comprising:

marks representing logical binary "ones" of data recorded perpendicular to the plane of the data tracks such that any two neighboring marks representing logical binary "ones" located on the same or neighboring tracks have their magnetic axis oriented in opposite directions from each other perpendicular to the tracks' plane and parallel to each other;

and marks representing logical binary "zeroes" of data through non-magnetization of a location on the magnetic medium or by demagnetization of a location on the magnetic medium through repeated recording;

wherein any two neighboring marks on any one of the data tracks stand at a predetermined distance from one another;

wherein the pattern of marks are placed in an order similar to a chess board order:

wherein the pattern of marks results in the formation of zero potential lines between the magnetic marks representing logical binary "ones", thus providing magnetic separation of the magnetic marks and elimination of cross-talk between the marks, wherein the zero potential lines are representative of locations where magnetic induction is nearly zero;

and wherein the pattern of marks allows for interaction between the magnetic head and the magnetic medium to be through non-contact discrete magnetic modulation.

2. A magnetic storage device comprising:

a recording magnetic head;

a reproducing magnetic head;

an erasing magnetic head;

a magnetic medium;

electronic recording circuit means including recording amplifier means and recording logical circuit means, the recording logical circuit means used to control and form logical values of recording data;

electronic reproducing circuit means including reproducing amplifier means and reproducing logical circuit means, the reproducing logical circuit means used to control data reproduction and to recognize logical values of magnetic marks recorded on the magnetic medium;

electronic erasing circuit means including erasing amplifier means, erasing oscillator means, and erasing logical means for erasing the magnetic marks or erasing one of a plurality of data tracks on the magnetic medium;

driving means to drive the magnetic medium;

wherein the magnetic medium has recorded thereon a pattern of magnetic marks comprising:

marks representing logical binary "ones" of data recorded perpendicular to the plane of the data tracks such that any two neighboring marks representing logical binary "ones" located on the same or neighboring tracks have their magnetic axes oriented in opposite directions from each other perpendicular to the tracks' plane and parallel to each other;

and marks representing logical binary "zeroes" of data through non-magnetization of a location on the magnetic medium or by demagnetization of a location on the magnetic medium through repeated recording;

wherein any two neighboring marks on any one of the data tracks stand at a predetermined distance from one another;

wherein the pattern of marks are placed in an order similar to a chess board order;

wherein the pattern of marks results in the formation of zero potential lines between the magnetic marks representing logical binary "ones", thus providing magnetic separation of the magnetic marks and elimination of cross-talks between the marks, wherein the zero potential lines are representative of locations where magnetic induction is nearly zero;

and wherein the pattern of marks allows for interaction between the magnetic head and the magnetic medium to be through non-contact discrete magnetic modulation.

3. The magnetic storage device of claim 2, wherein the magnetic heads are immovable, the magnetic medium is transported linearly, and the magnetic heads magnetically interact with one selected magnetic track on the medium.

4. The magnetic storage device of claim 2, wherein there are a plurality of immovable magnetic heads, and the magnetic medium is transported linearly.

5. The magnetic storage device of claim 2, wherein there are a plurality of magnetic heads quasi-immovable relative to a selected group of data tracks, each quasi-immovable head interacting with a corresponding data track.

6. The magnetic storage device of claim 2, wherein the magnetic medium is transported linearly, and the magnetic heads rotate and interact with the medium once or repeatedly during each rotation cycle.

7. The magnetic storage device of claim 2, wherein the magnetic medium is transported rotationally relative one of the magnetic heads.

8. The magnetic storage device of claim 2, wherein each of the recording, reproducing and erasing magnetic heads is a bi-polar head having bi-polar interaction with the magnetic medium, wherein:

the recording magnetic head comprises an electromagnet having an "O"-shaped first core and a recording winding of one or more turns, the first core forming a recording air working gap between ends of the first core to allow for placing of the magnetic medium within the air working gap, wherein the ends of the first core are sharpened to allow for the magnetic flux to the first core to be concentrated inside the recording air working gap to minimize interaction area between the recording head and the magnetic medium, wherein the ends of the first core are spaced from the magnetic medium, and wherein the recording air working gap is essentially constant and not dependent on location deviation of the medium inside of the recording air working gap;

the reproducing magnetic head comprises an "O"-shaped magnetic circuit having a toroidal second core wound with both primary and secondary windings, each of the primary and secondary windings having one or more turns, and a pair of reproducing focusing attachments attached at one end to the second core and forming a reproducing air working gap by their respective second ends;

the erasing magnetic head comprises an erasing electromagnet having an "O"-shaped third core and erasing winding having one or more turns, the third core forming an erasing air working gap between ends of the third core to allow for placement of the magnetic medium within the erasing air working gap, wherein the ends of the third core are sharpened to allow for the magnetic flux of the third core to be concentrated inside the erasing air working gap to minimize interaction area between the erasing head and the medium and to minimize a size of the magnetic mark placed on the magnetic medium, the ends of the third core spaced from the magnetic medium, and wherein the erasing air working gap is essentially constant and not dependent on location deviation of the medium inside of the erasing air working gap.

9. The magnetic storage device of claim 2, wherein each of the recording, reproducing, and erasing magnetic heads are uni-polar and have a uni-polar interaction with the magnetic medium, wherein:

the recording magnetic head comprises a recording electromagnet having a first bar-shaped core wound with recording windings having one or more turns, wherein one of two ends of the first bar-shaped core extends to the magnetic medium, is essentially sharpened, and forms a recording air working gap;

the reproducing magnetic head comprises a reproducing magnetic circuit having a toroidal core wound with reproducing winding having one or more turns, and one reproducing focusing attachment, extending to the magnetic medium, essentially sharpened, and forming a reproducing air working gap;

the erasing magnetic head comprises an erasing electromagnet having a third bar-shaped core wound by an erasing winding having one or more turns, wherein one of two ends of the third bar-shaped core extends to the magnetic medium, is essentially sharpened, and forms an erasing air working gap.

10. The magnetic storage device of claim 8, wherein a part of the core of each of the recording, reproducing, and erasing magnetic heads is movable relative to the medium and against a remaining part of their respective cores, and further wherein both ends of each of the respective cores retain precise coaxiality between the sharpen ends of the respective cores.

11. The magnetic storage device of claims 8 or 9, having a plurality of recording magnetic heads, a plurality of reproducing magnetic heads, and a plurality of erasing magnetic heads, the heads manufactured by methods of microelectronic engineering to essentially minimize interaction area between the magnetic heads and separate magnetic fields near the poles of the magnetic marks.

12. The magnetic storage device of claims 8 or 9, further comprising: rotation means for rotating the recording magnetic head, the reproducing magnetic head, and the erasing magnetic head relative to the magnetic medium, the rotation means including a rotating recording diamagnetic drum, a rotating reproducing diamagnetic drum, and a rotating erasing diamagnetic drum, each of said drums has a slot where each of the corresponding recording, reproducing, and erasing heads are affixed to corresponding recording, reproducing, and erasing drums in a center cross-section of each of the drums, each of the heads having focusing attachments attached by one end to the corresponding core of the head and by the other end to the corresponding slots of the drums to the air working gaps.

13. The magnetic storage device of claim 2, wherein the recording, reproducing, and erasing magnetic heads are the same universal head, the universal head having a first toroidal core including a primary winding and a secondary winding, both the primary and secondary windings having one or more turns, and one or a pair of focusing attachments attached by their first ends to the core and forming an air working gap by their second ends;

wherein the primary and secondary windings are connected and operated jointly during recording and erasing.

14. A magnetic storage device comprising:

a magnetic medium;

a universal magnetic head for recording, reproducing, and erasing magnetic marks on the magnetic medium;

electronic recording circuit means having recording amplifier means and recording logical circuit means, the recording logical circuit means controlling and forming logical value of recording data;

electronic reproducing circuit means having reproducing amplifier means and reproducing logical circuit means, wherein reproducing logical circuit means controls data reproduction and recognizes logical values of magnetic marks recorded on the magnetic medium;

electronic erasing circuit means including erasing amplifier means, erasing oscillator means and erasing logical means for erasing the magnetic marks or erasing a data track on the magnetic medium;

wherein the magnetic medium has recorded thereon a pattern of magnetic marks comprising:

marks representing logical binary "ones" of data recorded perpendicular to the plane of the data tracks such that any two neighboring marks representing logical binary "ones" located on the same or neighboring tracks have their magnetic axes oriented in opposite directions from each other perpendicular to the track's plane and parallel to each other;

and marks representing logical binary "zeroes" of data through non-magnetization of a location on the magnetic medium or by demagnetization of a location on the magnetic medium through repeated recording;

wherein any two neighboring marks on any one of the data tracks stand at a predetermined distance from one another;

wherein the pattern of marks are placed in an order similar to a chess board order;

wherein the pattern of marks results in the formation of zero potential lines between the magnetic marks representing logical binary "ones", thus providing magnetic separation of the magnetic marks and elimination of cross-talk between the marks, wherein the zero potential lines are representative of locations where magnetic induction is nearly zero;

and wherein the pattern of marks allow for interaction between the magnetic head and the magnetic medium to be through non-contact discrete magnetic modulation.

15. The magnetic storage device of claim 14 comprising:

rotation means for rotation of the universal magnetic head relative to the magnetic medium, the rotation means including a rotating diamagnetic drum having a slot wherein the universal head affixed to the drum is in a center cross-section of the drum and has pairs of focusing attachments extending by their second ends to the slot of the drum to the air working gap, wherein the recording and reproducing of the magnetic marks is realized by arc-shaped inclined tracks.

16. The magnetic storage device of claim 15 comprising:

the universal magnetic head having one core and at least one universal focusing attachment;

wherein the attachment is located in the center cross-section of the drum with the first end of the attachment attached to the core and the second end of the attachment to the slot to form an air working gap.

\* \* \* \* \*